United States Patent Office 2,786,977
Patented Mar. 26, 1957

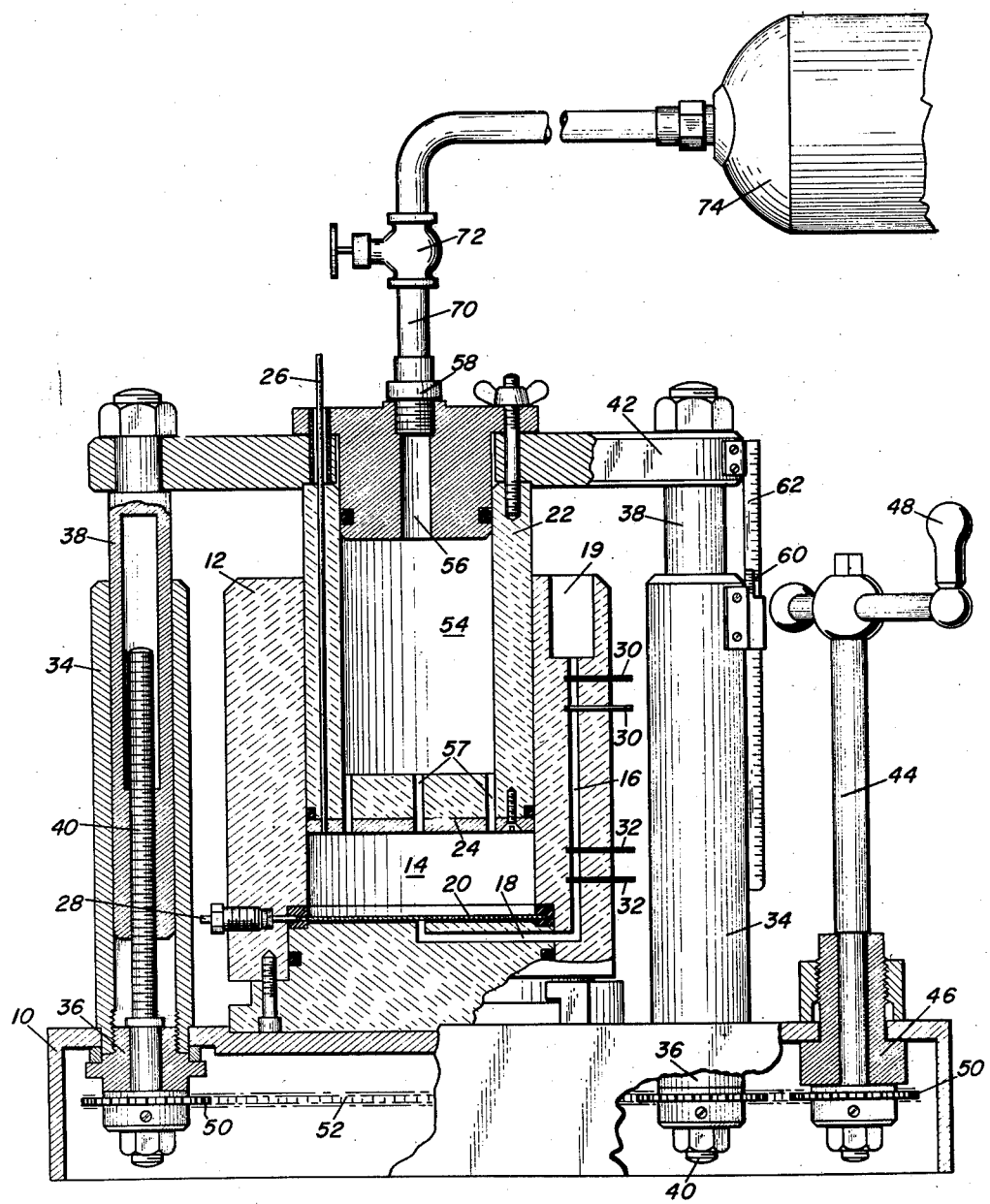

2,786,977

FILTRATION AND ELECTRICAL RESISTIVITY MEASURING DEVICE

Leon Blagg and Leon H. Robinson, Jr., Houston, Tex., assignors, by mesne assignments, to Esso Research and Engineering Company, Elizabeth, N. J., a corporation of Delaware Application October 19, 1955, Serial No. 541,483

7 Claims. (Cl. 324—30)

This invention relates to a device for filtering a filterable suspension of finely divided solids in a fluid medium and for determining the electrical resistivity of the suspension and also of the filter cake and filtrate formed by the filtration of such a suspension.

It is frequently desirable to determine the electrical resistivity of a suspension of finely divided solids in a fluid medium. An example of such a suspension is a drilling mud used in the drilling of wells through earthen formations. Suitable drilling muds, such as fresh water drilling muds, salt water drilling muds, oil base drilling muds, etc. comprise suspensions of finely divided solid materials such as clays, weighting agents, etc. in an appropriate fluid medium.

It is frequently desirable to determine the characteristics of earthen formations penetrated by a well bore by suitable means such as through the use of electrical well logging equipment of the type known to those skilled in the drilling art. If such well logging operations are to be performed in a satisfactory manner, it is frequently necessary to know the electrical resistivity of the drilling fluid and of the filter cake and filtrate which are formed by filtration of the drilling mud.

The apparatus of the present invention may be briefly described as a device for filtering a suspension of finely divided solids in a fluid medium and for determining the electrical resistivity of the suspension and of the filter cake and filtrate formed by the filtration of such suspension, such device comprising a housing defining first and second electrically insulated chambers and a passageway interconnecting said chambers, filter means in the bottom of the first chamber, a plunger reciprocably mounted in the first chamber, means connected with said plunger for reciprocating the same, electrical contact means on the bottoms of said first chamber and said plunger and spaced electrical contact means in said second chamber.

The present invention may also be considered in conjunction with the accompanying drawing wherein the sole figure is a sectional side elevational view of a preferred embodiment of the present invention.

Turning now to the drawing, the numeral 10 designates a base on any suitable construction on which is mounted a housing 12 defining a first chamber 14, a second chamber 16, and a passageway 18 interconnecting the bottoms of the chambers 14 and 16.

Suitable filter means 20 such as a filter screen, filter cloth, filter paper, etc. is positioned adjacent the bottom of the chamber 14 and covers the inlet to the passageway 18, sufficient space being provided between the filter means 20 and the bottom of the chamber 14 to permit ready flow of fluid from means 20 to the passageway 18.

The first chamber 14, which is preferably cylindrical in shape, is adapted to receive a filterable suspension of finely divided solids in a fluid medium and the second chamber 16 is adapted to receive filtrate formed by the filtration of the suspension. Accordingly, the chamber 16 may be of substantially smaller dimensions than the chamber 14. In the illustrated form of the invention, the chambers 14 and 16 and the passageway 18 are defined by a single thick-walled tubular housing 12; the chamber 14 being annularly defined by the wall and bottom of the housing 12. In this showing a filtrate tube formed in the wall of the housing 12 comprises the second chamber 16 and the chambers 14 and 16 are interconnected at the bottoms thereof by a passageway 18 formed in the bottom of the housing 12. Thus, the second chamber 16 of the drawing comprises, in effect, an extension of the passageway 18. There may also be provided in this situation a reservoir 19 for excess filtrate comprising, for example, an enlarged opening in the top of the housing 12. It will be understood that the housing 12 of the drawing has been shown for purposes of illustration only and that a housing of any other suitable construction may be used if desired such as, for example, a housing comprising separate members defining each of the chambers 14 and 16 and the interconnecting passageway 18.

The chambers 14 and 16 should be electrically insulated from each other. One manner in which this may be conveniently accomplished is by providing a housing 12 of an electrically non-conductive material such as a thermosetting or thermoplastic resin (i. e., a phenolic, urea or melamine resin, polystyrene, polymethyl methacrylate, etc.). It will be understood, of course, that only the surfaces of the chambers 14 and 16 need be electrically insulated so that, if desired, only such surface portions of the housing 12 need be formed of electrically non-conductive material.

There is also provided a plunger 22 reciprocably mounted in the chamber 14. The bottom surface of the plunger 22 comprises an electrical conductive surface 24 formed, for example, of a plate of any suitable electrically conductive material such as copper, iron, aluminum, etc. The remaining portion of the plunger 22 is preferably formed of an electrically non-conductive material of the type mentioned above although, again, only the side surfaces of the plunger 22 in contact with the sides of the chamber 14 need be insulated.

Electrical contacts are provided for the bottoms of the chamber 14 and the plunger 22. Thus, there may be provided an electrical lead 26 extending through the wall of the plunger 22 and terminating in contact with the electrically conductive plate 24 on the bottom thereof.

When the filter means on the bottom of the chamber 14 is a filter screen formed of electrically conductive material, as shown in the drawing, electrical contact may be provided through the provision of an electrical lead 28 extending through the side of the housing 12 into electrical contact with the filter screen 20. In other situations wherein a non-conductive filter medium is employed, the lead may be connected with suitable conductive wires, screens, etc. (not shown) positioned on the bottom of the chamber 12. Suitable electrical contact means such as probes 30—30 and 32—32 are provided in the second chamber 16. The leads 26 and 28 and the probes 30—30 and 32—32 are adapted for connection with any suitable electrical resistivity measuring means (not shown), such as a voltmeter, whereby the electrical resistivity of the material between electrical contacts 26 and 28 and between electrical probes 30—30 and 32—32 may be measured.

Suitable means of any desired construction are provided for reciprocating the plunger 22 in the chamber 14. Thus, there may be provided a pair of upstanding tubular columns 34—34 fixed to the base 10 and seated on journals 36—36. Interiorly threaded tubular support members 38—38 are inserted in the columns 34—34 and threaded onto vertically extending threaded rods 40—40 rotatably mounted in the journals 36—36.

A yoke 42 is fixed to the upper ends of the columns

38—38, the yoke 42 spanning the housing 12 and having fixed thereon the plunger 22.

Means of any suitable construction are provided for rotating the threaded rods 40—40. Thus, for example, there may be provided a crank shaft 44 journaled in a bearing 46 in the base 10 and provided at the upper end thereof with a crank 48. Cogs 50 fixed to the bottoms of the threaded rods 40—40 and the crank shaft 44 and interconnected by suitable driving means such as a continuous chain 52 may be provided, for example, as a means for operably interconnecting the crank shaft 44 with the threaded rods 40—40.

In accordance with a preferred embodiment of the present invention, the plunger 22 is provided with an interior passage, such as a passage defined by a central cavity 54, a top opening 56 communicating with the cavity 54, and a plurality of bottom openings 57 which likewise communicate with the cavity 54. In accordance with this embodiment of the present invention there is provided a suitable coupling 58 for a line 70 controlled by a valve 72 leading to a suitable source of fluid pressure such as, for example, a container 74 for nitrogen or a similar inert gas, which fluid pressure may, as a consequence, be introduced through the coupling 58 and the opening 56 into the caviy 54 and thence through the bottom openings 57 into the chamber 14.

There is also preferably provided, in accordance with a preferred embodiment of the present invention, suitable means for measuring the distance between the bottoms of the chamber 14 and the plunger 22. As an example, there may be provided a vernier 60 fixed to one of the support tubes 38 and slidably mounted in a suitable scale 62 fixed to a corresponding upstanding column 34. The vernier 60 and the scale 62 are suitably calibrated whereby the space in between the bottoms of the chamber 14 and the plunger 22 may be accurately measured.

Operation

In operation, the plunger 22 is first retracted in order that a suspension of finely divided solids in a fluid medium, such as a drilling mud, may be introduced into the chamber 14. This is accomplished by rotation of the crank 48 in a plunger-retracting direction whereby the crank shaft 44 and the chain 52 are correspondingly rotated. As a result, the cogs 50 and, hence, the threaded rods 40 will be rotated. Rotation of the rods 40—40 will, in turn, cause upward movement of the support columns 38—38 and hence of the yoke 42 and the plunger 22.

After a suitable quantity of a filterable suspension has been placed in the chamber 14, the plunger 22 is lowered by rotation of the crank 48 until the electrically conductive bottoms surface 24 of the plunger 22 is in contact with the upper surface of the finely divided suspension. The electrical resistivity of the suspension may then be determined by electrically connecting the leads 26 and 28 with a suitable device such as a voltmeter (not shown).

After the electrical resistivity of the suspension has been determined, the suspension is filtered to form a filter cake portion and a filtrate portion. One manner in which this may be accomplished is by rotation of the crank 48 whereby the plunger 22 will be lowered into the chamber 14 to force the fluid medium of the suspension through the filter means 20 into the passageway 18 and thence into the second chamber 16.

In accordance with a preferred form of the invention, fluid pressure from the source 72 is introduced by way of the line 74 and coupling 58 through the upper opening 56 in the plunger 22 and thence through the cavity 54 and the bottoms openings 57. As a consequence, the finely divided suspension in the chamber 14 will be rapidly filtered by fluid pressure means to form a filter cake fraction consisting essentially of the solids originally present in the suspension and a filtrate fraction consisting essentially of the fluid medium. After the filter cake has been formed, the fluid pressure is released and the plunger 22 is lowered by means of the crank 48 into firm engagement with the filter cake formed on the bottom of the chamber 14.

After the formation of the filter cake and the filtrate, the electrical resistivities thereof are measured. Electrical resistivity of the filter cake is measured in the indicated manner by electrically connecting a suitable measuring device (not shown) such as a voltmeter to the contacts 26 and 28. In a similar fashion, the electrical resistivity of the portion of the filtrate intermediate the probes 30—30 and 32—32 in the chamber 16 may be measured by electrically connecting such probes with a suitable measuring device such as a voltmeter (not shown). The thickness of the filter cake in the chamber 14 may also be measured by means of the vernier 60 and the scale 62.

The objects and advantages of the present invention having been ascertained, what is claimed is:

1. A device for filtering a filterable suspension of finely divided solids in a fluid medium comprising a housing defining first and second electrically insulated chambers and a passageway interconnecting said chambers, filter means adjacent the bottom of said first chamber, a plunger reciprocably mounted in said first chamber, means connected with said plunger for reciprocating said plunger in said first chamber, and electrical contact means on the bottoms of said first chamber and said plunger.

2. A device for filtering a filterable suspension of finely divided solids in a fluid medium comprising a housing defining an electrically insulated chamber and a tubular passageway communicating with the bottom of said chamber, filter means on the bottom of said chamber, a plunger reciprocably mounted in said chamber, means for reciprocating said plunger, electrical contact means on the bottom of said chamber and said plunger, and spaced electrical contact means in said passageway.

3. A device for filtering a filterable suspension of finely divided solids in a fluid medium comprising a housing of electrically non-conductive material defining an open-topped cylindrically shaped filter chamber, a separate filtrate tube and a passageway interconnecting the bottom of said filter chamber with said filtrate tube, a cylindrical plunger formed of electrically non-conductive material reciprocably mounted in said chamber, electrical contact means on the bottom of said plunger, electrically conductive filter means on the bottom of said chamber, and spaced electrical contact means in said filtrate tube.

4. A device as in claim 3 wherein the said plunger is a plunger having an interior opening therethrough, said device comprising, additionally, means carried by said plunger on the top thereof and communicating with the top of said interior opening for transmitting fluid pressure through said interior opening.

5. A device for filtering a filterable suspension of finely divided solids in a fluid medium comprising a base, an open-topped cylindrical housing mounted on said base and defining an interior chamber, said cylindrical housing having a filtrate tube in a side wall thereof and a passageway interconnecting the bottoms of said chamber and said filtrate tube, vertically reciprocable support means mounted on said base adjacent said housing, a plunger carried by said reciprocable means and slidably mounted in said chamber, an electrically conductive filter screen on the bottom of said chamber, an electrically conductive plate fixed to the bottom of said plunger, spaced electrical contact means in said filtrate tube and means mounted on said housing and connected with said support means for reciprocating the same, said chamber and said filtrate tube being insulated from each other.

6. A device for filtering a filterable suspension of finely divided solids in a fluid medium comprising a base, an upstanding cylindrical housing formed of electrical insulation material defining an interior chamber, said housing having a filtrate tube formed in the side wall thereof and having a passageway interconnecting the bottoms of said chamber and said filtrate tube, spaced upstanding tubular columns fixed to said base, support columns reciprocably mounted in said tubular columns, a yoke fixed to the tops of said support columns, a plunger fixed at the upper end thereof to said yoke and reciprocably mounted in said chamber, said plunger having a passageway formed therein for transmitting fluid pressure through said plunger into said chamber, means carried by said base for reciprocating said support columns, an electrically conductive filter screen in the bottom of said chamber, an electrically conductive plate on the bottom of said plunger, and spaced electrical contacts in said filter tube.

7. A device as in claim 6 comprising, additionally, a scale fixed to one of said upstanding tubular columns and a vernier slidably mounted on said scale fixed to a corresponding support column.

References Cited in the file of this patent

UNITED STATES PATENTS

| | | |
|---|---|---|
| 2,539,355 | Reichertz | Jan. 23, 1951 |
| 2,745,057 | Dotson | May 8, 1956 |